W. DURRAN.
TRACTION ENGINE.
APPLICATION FILED AUG. 14, 1911.

1,037,222.

Patented Sept. 3, 1912.
2 SHEETS—SHEET 2.

UNITED STATES PATENT OFFICE.

WILLIAM DURRAN, OF PERCY TOWNSHIP, ONTARIO, CANADA.

TRACTION-ENGINE.

1,037,222.  Specification of Letters Patent.  Patented Sept. 3, 1912.

Application filed August 14, 1911. Serial No. 643,959.

*To all whom it may concern:*

Be it known that I, WILLIAM DURRAN, resident of the township of Percy, in the Province of Ontario, in the Dominion of Canada, have invented certain new and useful Improvements in Traction-Engines; and I do hereby declare that the following is a full, clear, and exact description of the same.

The invention relates to improvements in traction engines, and particularly the power transmitting device to the wheels, as described in the present specification and illustrated in the accompanying drawings that form part of the same.

The invention consists essentially in the novel construction and arrangement of parts, whereby the power is transmitted from a main driving shaft to the front and rear wheels and the front wheels permitted a certain flexibility without disturbing the position of the driving shaft.

The objects of the invention are to devise a form of traction engine which will be very efficient under all the conditions of the surfaces of the ground over which said engine travels, to utilize the maximum power from the driving mechanism, and generally to provide a comparatively simple and very durable machine.

Figure 1:
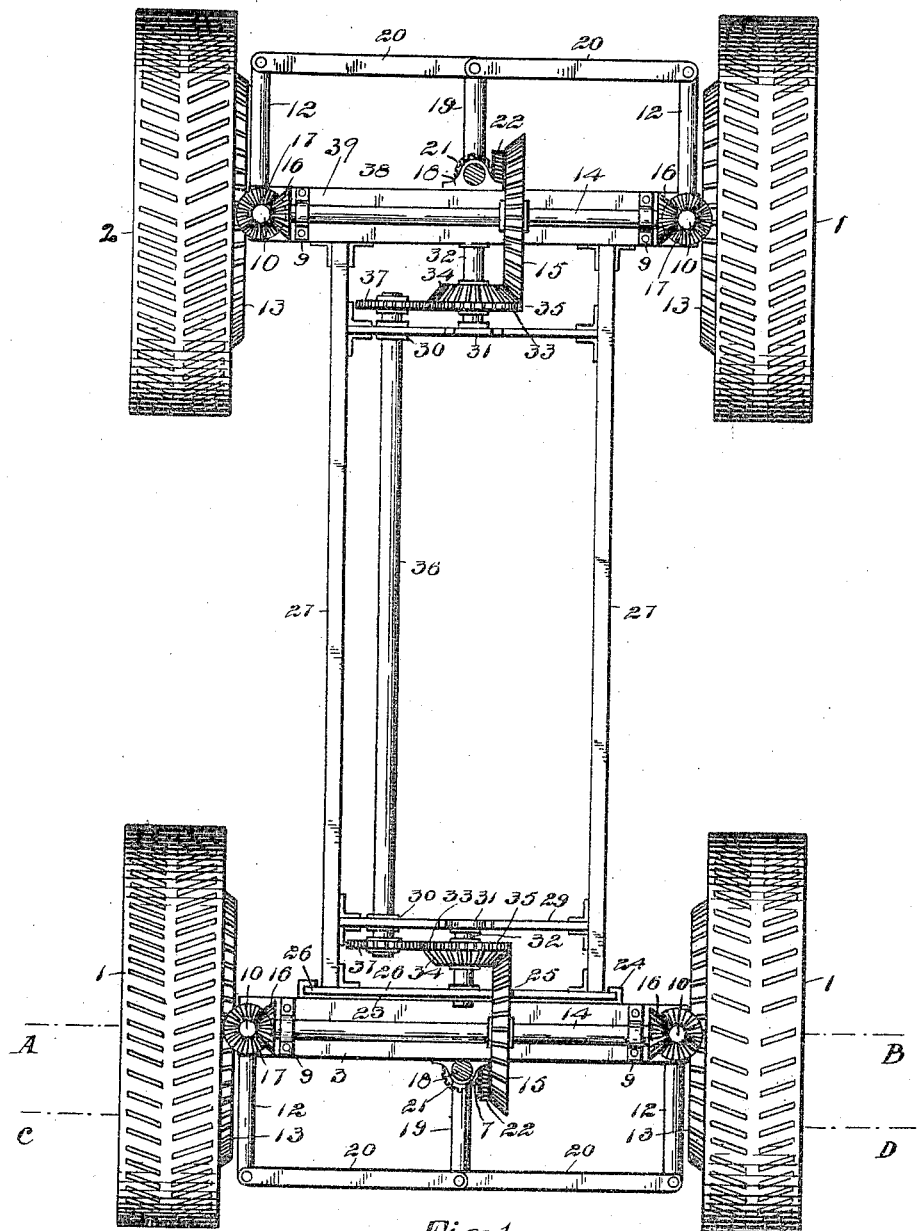
Figure 2:
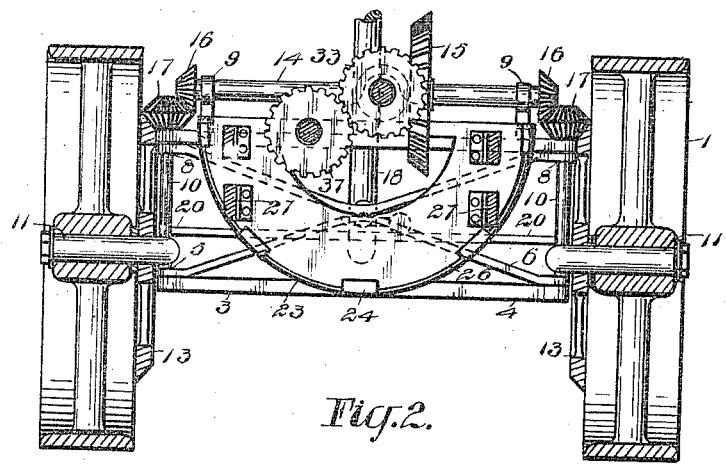
Figure 3:
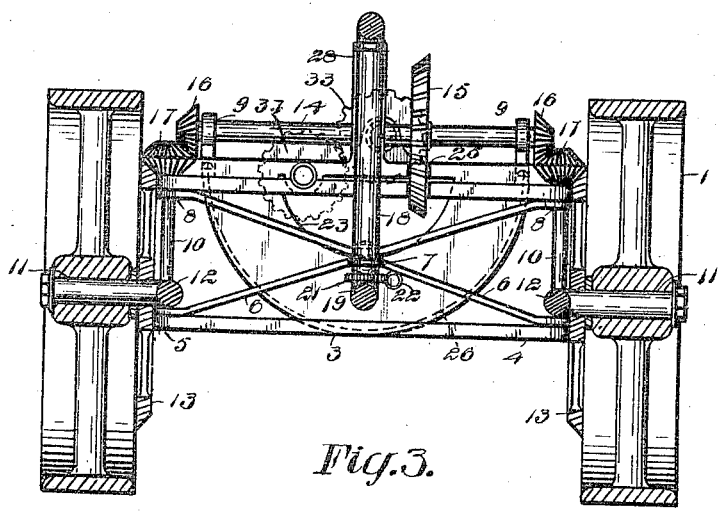

In the drawings, Figure 1 is a diagrammatic view, showing the preferred construction of the frame, the positions of the wheels and the arrangement of the gear connections. Fig. 2 is a cross sectional view on the line A—B in Fig. 1. Fig. 3 is a cross sectional view on the line C—D in Fig. 1.

Like numerals of reference indicate corresponding parts in each figure.

Referring to the drawings, 1 are the wheels forming the front drivers. 2 are the wheels forming the rear drivers, both sets of wheels being made in the customary form as used in traction engines, or in any other suitable way.

3 is the front axle structure, formed of the bottom bar 4, said bottom bar having the bearings 5 at each end thereof, and the frame 6 supported on said bottom bar, having a central vertical bearing 7, the vertical bearings 8 at each side thereof being in alinement with the bearings 5 and the horizontal bearings 9 adjacent to the vertical bearings 8.

10 are vertical shafts journaled in the bearings 5 and 8.

11 are axles at their inner ends fixedly mounted on the vertical shafts 10 adjacent to the bearings 5 on the inner sides and having the arms 12 therefrom projecting laterally and forwardly, said arms being off-set at their ends. The wheels 1 are loosely mounted on the axles 11.

13 are bevel gear wheels fixedly secured to the inner faces of the wheels 1 and encircling the axles 11 and concentric therewith.

14 is a shaft journaled in the bearings 9 extending beyond said bearings at each end thereof and terminating adjacent to the vertical shaft 10.

15 is a gear wheel mounted on the shaft 14 intermediate of the distance between the bearings 8.

16 are bevel pinions mounted one at each end of the shaft 14 and coacting with the bevel pinions 17 loosely mounted on the vertical shafts 10, said bevel pinions 17 being double faced pinions, that is to say, having upper and lower bevel faces, the lower bevel face coacting with the bevel gear wheels 13 and thus operatively connecting the shaft 14 with the wheels 1 for the purpose of driving the latter.

18 is a vertical shaft, journaled in the central bearing 7 and having at the lower end thereof, a forwardly extending arm 19, said arm having an off-set and said off-set being joined to the off-sets of the arms 12 by the links 20, thus providing a steering gear, preferably operated by the worm wheel 21 mounted on the lower end of said shaft 18 and coacting with the worm 22.

23 is a frame preferably part circular in shape and carrying at the curved edge thereof the track 24, said frame 23 being rigidly secured to the front axle structure 3 at the rear side thereof and having the gear wheel opening 25 through which the gear wheel 15 projects.

26 is a segment rail, traveling in the trackway 24 and suitably held to the frame 23 by lugs or the particular formation of said track-way, the said segment rail 26 swinging around in said track-way in a comparatively free manner.

27 are beams rigidly secured to the segment rail 26 in upper and lower pairs and extending rearwardly.

28 is a bracket rigidly secured to the frame 23 and forming an upper bearing for the vertical steering shaft 18.

29 is the main shaft frame carrying the bearing 30 for the main shaft and the bearing 31 for an auxiliary shaft, said frame 29 being supported by the beams 27, slightly to the rear of the frame 23.

32 is an auxiliary shaft journaled in the auxiliary bearing 31 and a corresponding bearing in the frame 23.

33 is a gear wheel, having the two toothed faces 34 and 35, the face 34 being beveled and the face 35 being a spur gear, the bevel face 34 coacting with the gear wheel 15.

36 is the main shaft, journaled in the bearing 30 and carrying at the end thereof the spur gear wheel 37, said spur gear 37 coacting with the spur gear face 35, thus establishing a connection from the main shaft, which is suitably driven, by means of the spur gear 37, the spur gear face 35, the bevel face 34 the gear wheel 15, the pinion 16 and the pinion 17 to the gear wheels 13 and consequently to the drivers 1.

38 is the rear frame corresponding to the frames 23, but without the track-way 24, said frame 38 being rigidly secured to the beams 27 and supported by the rear axle structure 39.

All the gear connections to the rear drivers 2 are precisely the same as the connections to the front drivers, the only difference being the segment rail to provide flexibility in the front of the machine. The steering arrangements are just the same, though it will be readily understood that the steering wheels will be at one convenient point, therefore, the worm shafts from the vertical steering shafts will extend to that one point which likely will be in the rear of the machine. The main shaft is suitably driven by an engine placed in any convenient part, or in fact any suitable arrangement of motive power, the features of this invention being the transmission of power from the main shaft to the wheels, the flexibility of the front portion of the machine, the two sets of driving wheels and similarly the two sets of steering wheels, all being points of great importance in the construction of traction engines.

What I claim as my invention is:

In a traction engine, a front axle structure, a frame secured thereto, a segment rail slidably arranged in said frame, a rear axle structure, beams connecting said rear axle structure and said segment rail, main shaft frames carrying bearings for the main shaft and auxiliary shafts, cross shafts journaled in said axle structures, vertical shafts journaled at each side of said structures, wheels having axles fixedly mounted on said vertical shafts, a gear mounted on each of said cross shafts, auxiliary shafts journaled in said auxiliary bearings, gears mounted on said auxiliary shafts having double faces and coacting with said gears of said cross shafts, a main shaft journaled in said main shaft frames having gears fixedly mounted thereon coacting with the other face of said gears on the auxiliary shafts, bevel pinions mounted at the ends of said cross shafts, bevel pinions mounted on said vertical shafts, and bevel gear wheels fixedly mounted on the inside of the wheels and coacting with said bevel gears of said vertical shafts and suitable steering means supported by said axle structures.

Signed at town of Campbellford, Province of Ontario, this 11th day of July 1911.

WILLIAM DURRAN.

Witnesses:
J. P. ARCHER,
J. B. FERRIS.

Copies of this patent may be obtained for five cents each, by addressing the "Commissioner of Patents, Washington, D. C."